(12) United States Patent
Moe et al.

(10) Patent No.: US 9,382,135 B2
(45) Date of Patent: Jul. 5, 2016

(54) SEAWATER DESALINATION PROCESS

(75) Inventors: Neil Edwin Moe, Las Cruces, NM (US); John Barber, Guelph (CA)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 13/267,553

(22) Filed: Oct. 6, 2011

(65) Prior Publication Data

US 2013/0087501 A1 Apr. 11, 2013

(51) Int. Cl.
| | |
|---|---|
| *B01D 61/00* | (2006.01) |
| *B01D 63/00* | (2006.01) |
| *C02F 1/44* | (2006.01) |
| *C02F 1/04* | (2006.01) |
| *C02F 1/469* | (2006.01) |
| *C02F 103/08* | (2006.01) |

(52) U.S. Cl.
CPC .............. *C02F 1/441* (2013.01); *C02F 1/042* (2013.01); *C02F 1/4695* (2013.01); *C02F 2103/08* (2013.01); *C02F 2303/10* (2013.01); *C02F 2303/22* (2013.01); *Y02W 10/30* (2015.05)

(58) Field of Classification Search
CPC ...... C02F 1/44; B01D 61/025; B01D 61/364; B01D 61/422; F01K 25/06
USPC ................... 210/652, 195.2, 257.2, 175, 180; 203/10, 12; 204/518, 520, 542, 660
See application file for complete search history.

(56) References Cited

U.S. PATENT DOCUMENTS

| | | | |
|---|---|---|---|
| 2,947,688 A | 8/1960 | Murphy | |
| 3,357,077 A * | 12/1967 | Rohs | 409/235 |
| 3,574,077 A | 4/1971 | Tsunoda | |
| 4,141,879 A * | 2/1979 | McCarroll | 524/196 |
| 4,171,409 A | 10/1979 | Loeb | |
| 5,238,574 A * | 8/1993 | Kawashima et al. | 210/652 |
| 5,376,250 A | 12/1994 | Hamano | |
| 6,783,682 B1 | 8/2004 | Awerbuch | |

(Continued)

FOREIGN PATENT DOCUMENTS

| | | |
|---|---|---|
| EP | 0051104 A1 | 5/1982 |
| EP | 1746680 A1 | 1/2007 |

(Continued)

OTHER PUBLICATIONS

Search Report and Written Opinion from corresponding PCT Application No. PCT/US2012/054970 dated Nov. 30, 2012.

(Continued)

*Primary Examiner* — Ana Fortuna

(57) ABSTRACT

In a desalination system, water is treated, for example by reverse osmosis, to produce desalinated product water and a reject stream. Salt from the reject stream is transferred to a flow of low salinity wastewater, such as effluent from a municipal wastewater treatment plant. For example, the reject stream may be fed to the high salinity cell in an electrodialysis (ED) unit. The adjacent low salinity cell receives the low salinity wastewater. The high salinity and low salinity cells are separated by ion exchange membranes. The salty wastewater is discharged, for example to the ocean. The salt-reduced reject stream is treated to extract more product water from it, for example by recycling it to the feed water. Less feed water is needed to produce a given volume of product water. If a thermal desalination unit is combined with divalent ion selective ion exchange membranes, then scaling is reduced.

20 Claims, 6 Drawing Sheets

(56) References Cited

U.S. PATENT DOCUMENTS

| | | | |
|---|---|---|---|
| 6,805,796 B2* | 10/2004 | Hirose et al. | 210/321.76 |
| 6,805,797 B1* | 10/2004 | Jung | 210/610 |
| 6,998,053 B2 | 2/2006 | Awerbuch | |
| 7,083,730 B2* | 8/2006 | Davis | 210/652 |
| 7,198,722 B2 | 4/2007 | Hussain | |
| 7,459,088 B2 | 12/2008 | Davis | |
| 7,501,064 B2 | 3/2009 | Schmidt et al. | |
| 8,277,660 B2* | 10/2012 | Kimball et al. | 210/651 |
| 8,695,343 B2* | 4/2014 | Moe | 60/649 |
| 2004/0055955 A1* | 3/2004 | Davis | 210/652 |
| 2006/0060532 A1* | 3/2006 | Davis | 210/652 |
| 2006/0144789 A1 | 7/2006 | Cath et al. | |
| 2008/0230376 A1 | 9/2008 | Brauns | |
| 2008/0277341 A1 | 11/2008 | Huang et al. | |
| 2010/0072136 A1 | 3/2010 | Voutchkov | |
| 2010/0181252 A1* | 7/2010 | Mayer et al. | 210/638 |
| 2011/0210069 A1* | 9/2011 | Xiong et al. | 210/638 |
| 2012/0037566 A1 | 2/2012 | Achilli et al. | |
| 2012/0152721 A1* | 6/2012 | Gaid et al. | 203/10 |
| 2012/0202279 A1* | 8/2012 | Murahara | 435/289.1 |
| 2013/0062207 A1 | 3/2013 | Fu | |

FOREIGN PATENT DOCUMENTS

| | | | | |
|---|---|---|---|---|
| EP | 2070583 A3 | 11/2009 | | |
| EP | 2149625 A1 | 2/2010 | | |
| GB | 1350766 A | 4/1974 | | |
| WO | 2007/009196 A1 | 1/2007 | | |
| WO | 2010/008275 A1 | 1/2010 | | |
| WO | 2010/059053 A1 | 5/2010 | | |
| WO | 2010/062175 A1 | 6/2010 | | |
| WO | 2010139773 A1 | 12/2010 | | |
| WO | 2011/050473 A1 | 5/2011 | | |
| WO | WO 2011/050473 | * | 5/2011 | C02F 1/459 |

OTHER PUBLICATIONS

Forgacs, C. "Recent Developments in the Utilization of Salinity Power" Desalination, 1982, p. 191-195, vol. 40.
Welgemoed, T.J. and Schutte, C.F. "Capacitive Deionization TechnologyTM: An Alternative Desalination Solution" Desalination, 2005, p. 327-340, vol. 183.
Turek M. and Bandura B. "Renewable Energy by Reverse Electrodialysis" Desalination, 2007, p. 67-74, vol. 205.
Turek M. et al., "Power production from coal-mine brine utilizing reversed electrodialysis" Desalination, 2008, p. 462-466, vol. 221.
Brauns, E. "Salinity gradient power by reverse electrodialysis: effect of model parameters on electrical power output" Desalination, 2009, p. 378-391, vol. 237.
Choi, Yong-Jun, et al. "Toward a combined system of forward osmosis and reverse osmosis for seawater desalination" Desalination, 2009, p. 239-246, vol. 247.
Audinos, R., Electric power produced from two solutions of unequal salinity by reverse electro-dialysis, Ind. J. Chem. Sec. A, 31A (1992) 348-354.
Van Den Ende, Kees and Groeman, Frederik "Blue Energy Briefing Paper" KEMA Consulting, Oct. 2007.
Lacey, R.E. "Energy by Reverse Electrodialysis" Ocean Energy, 1980, p. 1-47, vol. 7.
Dlugolecki, Piotr, et al. "Practical Potential of Reverse Electrodialysis as a Process for Sustainable Energy Generation" Environmental Science & Technology, 2009, p. 6888-6894, vol. 43.
Dlugolecki, Piotr, et al. "Current status of ion exchange membranes for power generation from salinity gradients" Journal of Membrane Science, 2008, p. 214-222, vol. 319.
Veerman, J. et al. "Reverse electrodialysis: Performance of a stack with 50 cells on the mixing of sea and river water" Journal of Membrane Science, 2009, p. 136-144, vol. 327.
Post, Jan W. et al. "Influence of multivalent ions on power production from mixing salt and fresh water with a reverse electrodialysis system" Journal of Membrane Science, 2009, p. 65-72, vol. 330.
Veerman, J. et al. "Reverse electrodialysis: Comparison of six commercial membrane pais on the thermodynamic efficiency and power density" Journal of Membrane Science, 2009, p. 7-15, vol. 343.
Post, Jan W. et al. "Salinity-gradient power: Evaluation of pressure-retarded osmosis and reverse electrodialysis" Journal of Membrane Science, 2007, p. 218-230, vol. 288.
Suda, F. et al. "A dialytic battery with ion-exchange membranes" Journal of Advanced Science, 1995, p. 182-187, vol. 7 No. 3&4.
Azuma, S. "Characteristic of a DB(dualytic battery) generation using pressurized saline water" Journal of Advanced Science, 1999, p. 107-108, vol. 11, No. 2.
Iwashita, Tsutomu and Urgesa, Sadao "Performance comparison of DB and UDB generator" Journal of Advanced Science, 2002, p. 71-72, vol. 14, No. 1&2.
Charlier, Roger "Oceans and Electrical Power (Part II)" International Journal of Environmental Studies, 1982, p. 7-16, vol. 19.
Jagur-Grodzinski, J., R. Kramer, Novel Process for direct conversion of free energy of mixing into electric power. Ind. Eng. Chem. Process Des. Dev. 25 (1986) 443-449.
Haruhiko et al., "Energy Conversion Efficiency of Heat Discharged from Factory to Electricity via Dialytic Battery with Concentrated Sea", Bulletin of the Society of Sea Water Science, vol. No. 54, pp. 136-145, 2000.
Watson et al., "Desalting handbook for planners", Desalination and Water Purification Research and Development Program Report No. 72, 3rd Edition, Jul. 2003.
Jones et al., "Recent developments in salinity gradient power", OCEANS, Proceedings, pp. 2284-2287, 2003.
Post et al., "Towards implementation of reverse electrodialysis for power generation from salinity gradients", Desalination and Water Treatment, REDstack paper, vol. No. 16, pp. 182-193, 2010.

* cited by examiner

SEAWATER DESALINATION PROCESS

FIELD

This specification relates to desalination and electrodialysis.

BACKGROUND

The following discussion is not an admission that anything discussed below is citable as prior art or common general knowledge.

Seawater may be desalinated by reverse osmosis. Water is taken from the ocean through an intake system into a treatment plant. The raw seawater is pre-treated, for example to remove particles and organic foulants. The pre-treated water then passes through a reverse osmosis system. A portion of the seawater permeates through one or more stages of membranes and is used, for example, as municipal drinking water.

Another portion of the seawater is retained or rejected by the membranes. This reject stream has an increased salt content and osmotic pressure. This increase in osmotic pressure limits the extent to which the reject stream can be concentrated, and therefore limits the recovery of the process. Most seawater reverse osmosis plants are designed to run at about 35-50% recovery. In some instances, for example with very high pressure operation or additional scaling control steps, higher recovery rates of 55-60% are possible.

Scaling may also limit the maximum concentration of the reject stream in reverse osmosis and other types of desalination systems. For example, thermal desalination devices such a evaporators are typically limited to recovery rates of about 10-40%, primarily due to scaling problems. Calcium sulfate in particular becomes less soluble as the temperature increases and problems with calcium sulfate scale may determine the maximum operating temperature and recovery rate.

Due to the limited recovery of a desalination plant, the intake and pre-treatment systems handle significantly more than the output of potable water. For example, a 50 MGD seawater reverse osmosis (SWRO) desalination system operating at 40% recovery requires intake and pre-treatment systems sized for about 125 MGD. Each of the intake and pre-treatment systems may be as expensive as the reverse osmosis system itself. The intake and pretreatment systems also consume power and chemicals. Further, withdrawing excess seawater increases the ecological damage to sea life caused by the desalination plant.

INTRODUCTION TO THE INVENTION

The following summary is intended to introduce the reader to the invention and not to limit any claimed invention.

A desalination system and process are described in this specification. The system and process may be used, for example, to produce potable or other supplies of water from seawater, including brackish coastal waters. Without limiting the potential uses of the system and process, the system and process may be used to recover a large percentage of the water supplied to them. Optionally, 80% or more, or nearly all, of the supplied water may be recovered as desalinated water.

As an overview, this specification describes a system and process in which water is treated, for example by reverse osmosis, to produce desalinated product water and a reject stream. Salt from the reject stream is transferred to a flow of low salinity wastewater, such as effluent from a municipal wastewater treatment plant. For example, the reject stream may be fed to the high salinity cell in an electrodialysis (ED), which may be a reverse electrodialysis (RED) unit. The adjacent low salinity cell receives the low salinity wastewater. The ED device comprises many alternating high salinity and low salinity cells separated by ion exchange membranes. The salty wastewater is discharged, for example to the ocean. The salt-reduced reject stream is treated to extract more product water from it, for example by recycling it to the desalination unit.

The RED unit, if used, may be used to generate electricity from the spontaneous movement of the salt ions into the wastewater. Alternatively, another device to capture salinity gradient power, such as a capacitative deionization device, may be used. Whether power is applied to remove salt from the reject stream, or power is collected from the spontaneous movement of salt from the reject stream, very little wastewater, if any, enters the reject stream. Any contaminants previously present in the wastewater stream are therefore not concentrated even with a recycle of the salt-reduced reject stream.

The increased salinity of the wastewater is advantageous if the wastewater is discharged to the ocean. Optionally, the wastewater may be enriched with salt to a concentration that approximates the salinity of the source water that the wastewater will be discharged into.

The system and process may also be used with inland or underground sources of brackish water, although appropriate treatment of the discharged wastewater may be desirable to preserve the long term integrity of the water supply.

A thermal desalination unit may be used instead of reverse osmosis to produce the desalinated product water. In that case, divalent ion selective membranes are preferably used to remove salt from the reject stream. Ions that tend to cause scaling in thermal desalination process, particularly calcium and sulfate, are removed from the salt reduced reject water through the divalent ion selective membranes. The salt reduced reject water is mixed with feed water upstream of the thermal desalination unit. This produces a combined feed with a decreased concentration of scale forming ions, which allows the thermal desalination unit to be operated at a higher recovery, at a higher temperature, or with more effects.

DETAILED DESCRIPTION

Figure 1:
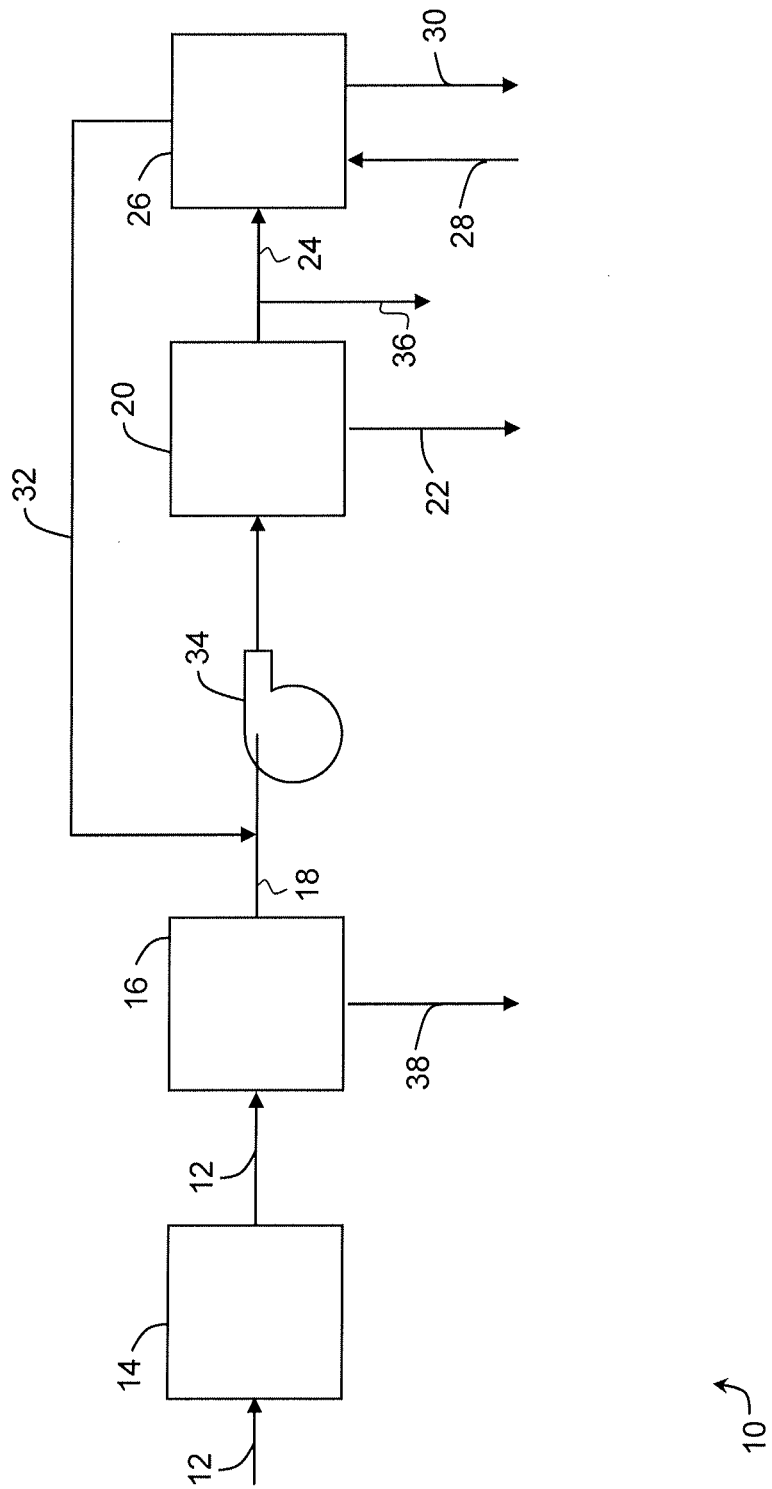
FIG. 1 is a schematic process flow diagram of a water treatment system.

FIG. 1 shows a water treatment system 10. The water treatment system 10 is used to desalinate seawater to produce a supply of municipal potable water.

In the water treatment system 10, raw seawater 12 is drawn from the ocean through an intake system 14. The intake system 14 typically comprises one or more inlet pipes that take in seawater, preferably through a screening or inlet device that attempts to reduce the amount of sea life drawn into the intake system 14. The intake system 14 also typically has pumps and holding tanks to remove and store the raw seawater 12, as is known in the art.

Raw seawater 12 continues to flow from the intake system 14 to a pre-treatment system 16. The pre-treatment system 16 may include various filtration or chemical treatment steps to remove contaminants from the raw sea water 12. The specific pre-treatment steps may be chosen based on the constituents of the raw seawater 12, as is known in the art. As one example, the raw seawater 12 may be filtered through an ultrafiltration or microfiltration membrane unit. The permeate from the membrane unit may be further disinfected with chlorine or treated with other chemicals to kill or inhibit the growth of micro-organisms. Pretreated seawater 18 is discharged from the pre-treatment system 16. A residual stream 38 from the pretreatment system 16 contains high suspended solids and may be disposed of.

The pretreated seawater 18 flows by way of a pump 34 to a desalination system 20. The desalination system may be, for example, a reverse osmosis system. A reverse osmosis system includes one or more pressure vessels, each vessel typically containing multiple reverse osmosis elements. The vessels may be configured to provide multiple passes if required.

Salt is removed from a portion of the pretreated sweater 18 in the desalination system 20 to produce potable product water 22. Salt is concentrated in another portion of the pretreated seawater 18 and forms a reject stream 24, alternatively called brine or concentrate. If the desalination system 20 comprises a reverse osmosis system, the reject stream 24 will be at a high pressure. Pressure energy can be recovered from the reject stream 24, for example by passing the reject stream 24 through a turbine connected to an electrical generator.

The reject stream 24 flows to an ion-exchange membrane device 26, for example an electrodialysis (ED) device. Optionally, the ED device may be an electrodialysis reversal (EDR) device. Further optionally, the ED device may be a reverse electrodialysis device (RED). The membrane device 26 comprises alternating low salinity cells and high salinity cells separated by ion-exchange membranes. The reject stream 24 passes into the high salinity cells of the membrane device 26, optionally in multiple passes or by way of a recycle loop. The low salinity cells are fed with an initially low salinity water 28, optionally in multiple passes or a recycle loop. The initially low salinity water 28 may be, for example, effluent from a municipal or industrial wastewater treatment plant.

Salty discharge water 30 is withdrawn from the membrane device 26, optionally as a bleed from a recycle loop. The salty discharge water 30 may be discharged, for example back into the ocean that the seawater was taken from. The water treatment system 10 may be located near a wastewater treatment plant that would otherwise discharge its effluent into the ocean. In that case, it is beneficial to convert low salinity wastewater, as would typically be produced from a municipal wastewater treatment plant, into salty discharge water 30. This avoids damage to ocean life caused by discharging an effluent with a significantly different salinity compared to the ocean. Optionally, the water treatment system 10 can be configured or operated so as to produce salty discharge water 30 having a salinity within 10% of the salinity of the raw seawater 12.

Salt reduced reject water 32 is also removed from the membrane system 26. The salt reduced reject water 32 is treated by a further desalination process to produce additional product water. For example, the salt reduced reject water 32 may be mixed with the pre-treated seawater 18 or otherwise sent to the desalination unit 20. The entire flow of salt reduced reject water 32 can be recycled for co-treatment with the pretreated seawater 18 in the desalination unit 20. This results in nearly 100% recovery of the raw seawater 12 on a system level. Alternatively, a bleed 36 from the salt reduced reject water 32 or the reject water 24 may be used. The bleed 36 prevents the build up of minor contaminants, if any, that are retained by the desalination system 20 and not removed by the membrane unit 26 to an extent that they would reach an undesirable concentration with a complete recycle. The bleed 36 may be mixed with the salty discharge water 30 or otherwise removed from the water treatment system 10. Even with a bleed 36, 80% or more of the raw seawater 12 or the pre-treated seawater 18 may be recovered as product water 22.

The movement of salt from the reject stream 24 to the low salinity water 28 occurs spontaneously across the ion exchange membranes in the membrane device 26. An ED device adds a current to increase the rate of salt movement and so allows for a compact device requiring less membrane material. However, rather than using power to drive the salt migration process, the membrane unit 26 may be used to generate electricity using reverse electrodialysis (RED). The electricity generated can be used to drive the reverse osmosis process or for other purposes. Recoverable power may be in the order of 0.5 kwh/m$^3$ of potable water produced.

Other devices might also be substituted for the membrane device 26. For example, using a capacitative deionization device, alternatively called the capacitative method, carbon electrodes could be used to adsorb ions from the reject water, and then the ions could be desorbed into the low salinity waste water. However, since the goal is to move salt from the reject water to the low salinity wastewater, methods such as pressure-retarded osmosis are not preferred. Using pressure-retarded osmosis, the wastewater would be mixed with the reject water potentially causing problems with contamination of the product water.

Figure 2:
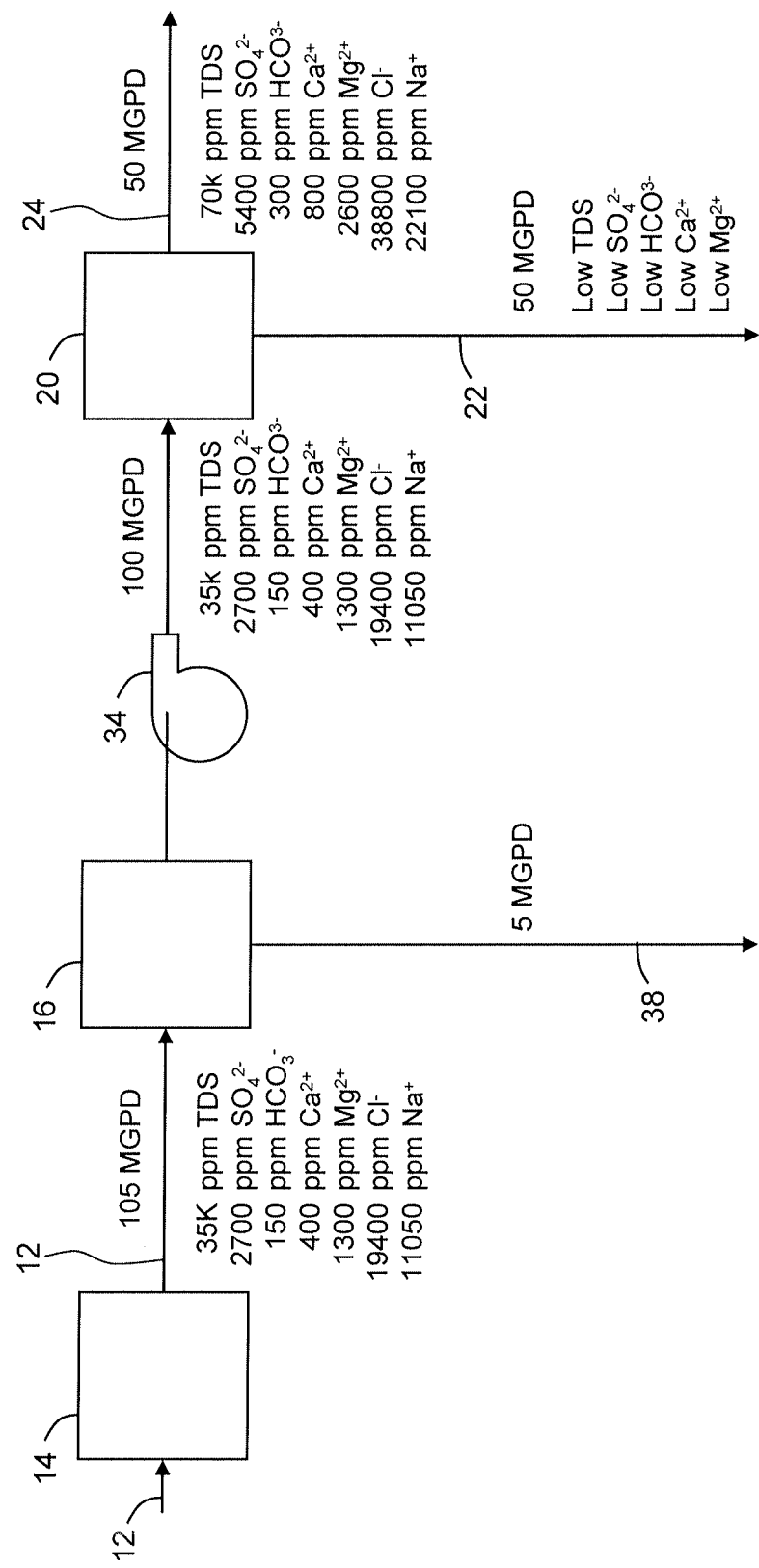
FIG. 2 is a schematic process flow diagram of a SWRO system operating at 50% recovery for use in a comparative example with FIG. 3.
Figure 3:
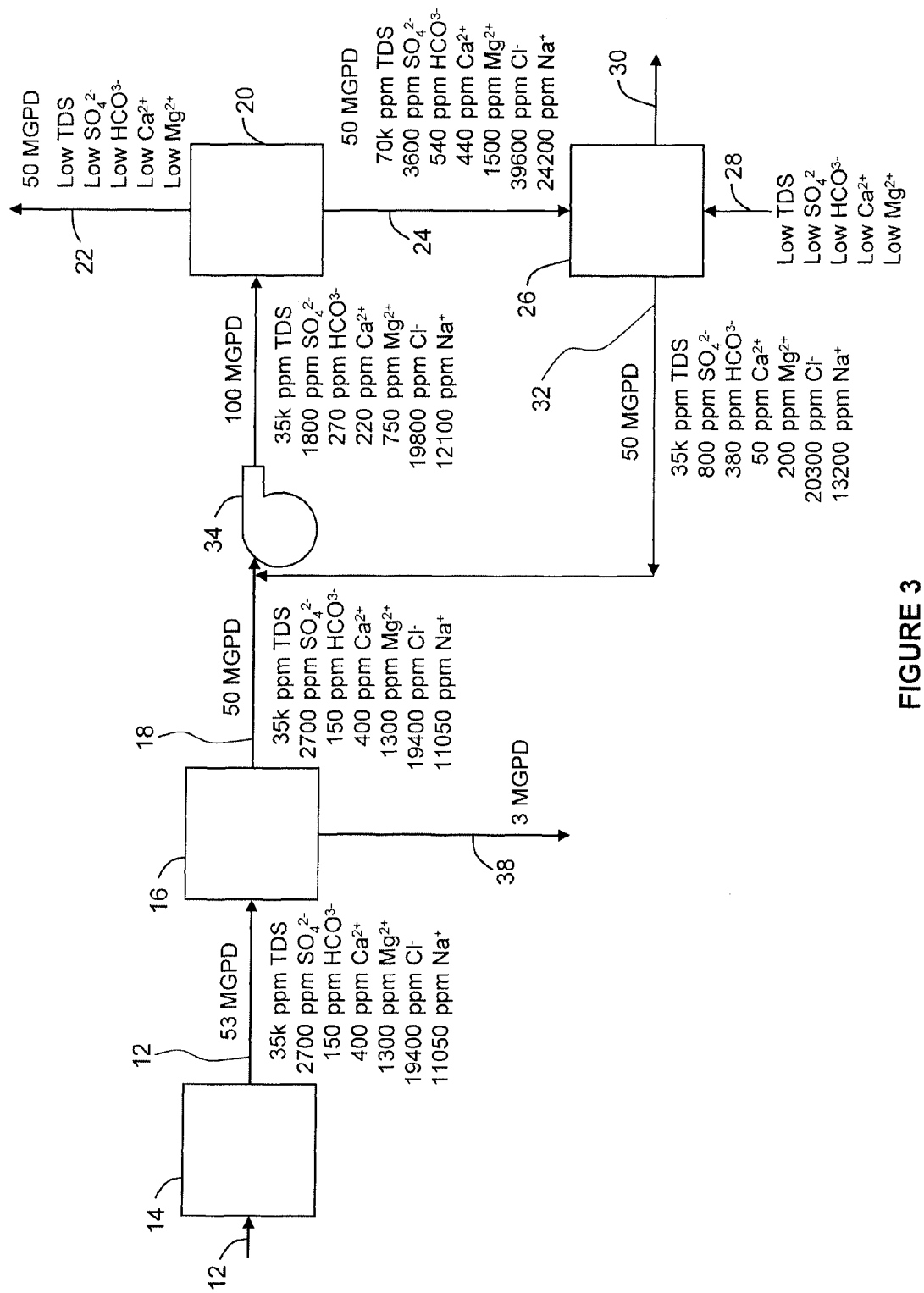
FIG. 3 is a schematic process flow diagram of the water treatment system of FIG. 1 operating at 50% recovery in a desalination step for use in a comparative example with FIG. 2.
Figure 4:
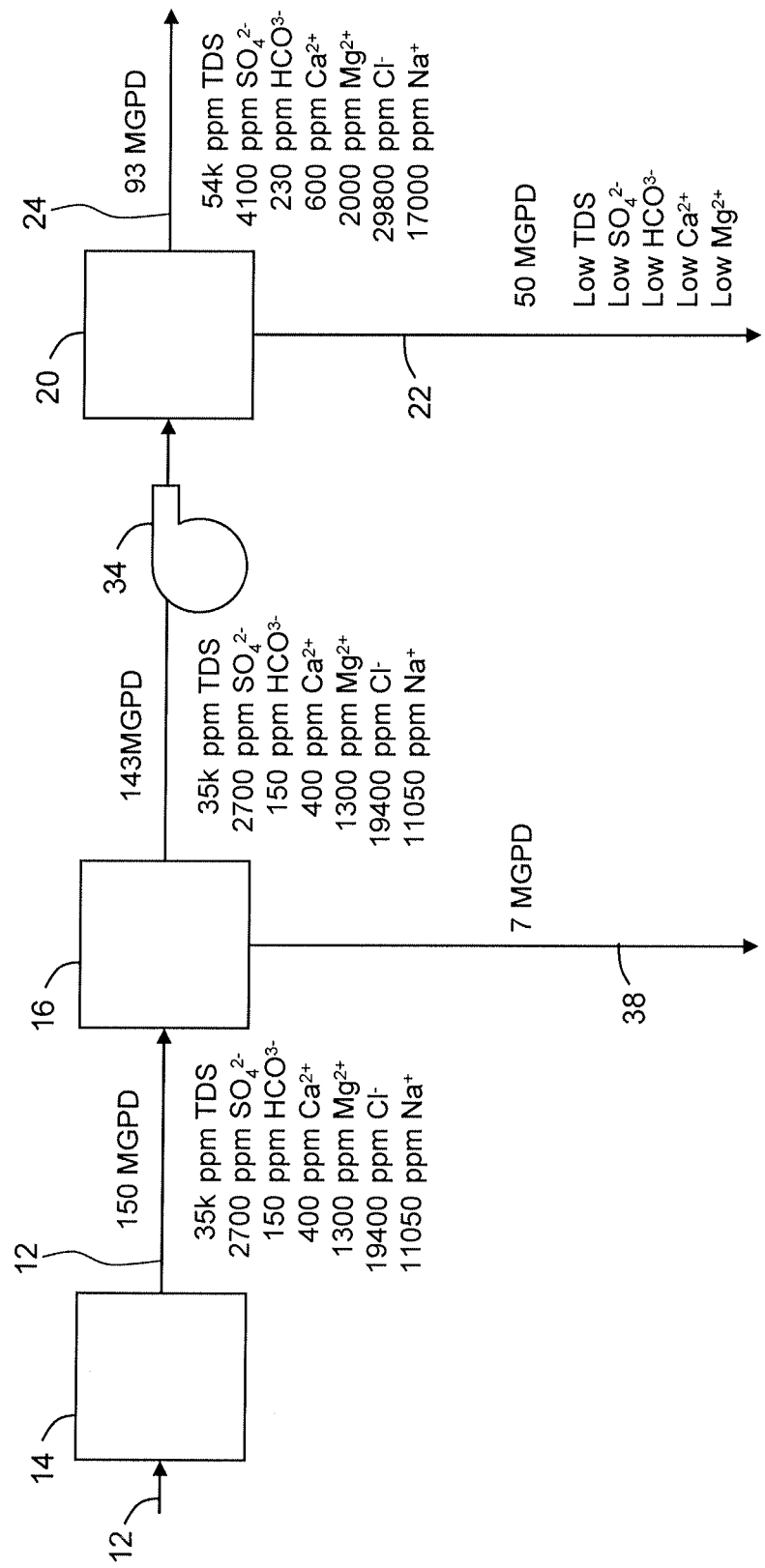
FIG. 4 is a schematic process flow diagram of a SWRO system operating at 35% recovery for use in a comparative example with FIG. 5.
Figure 5:
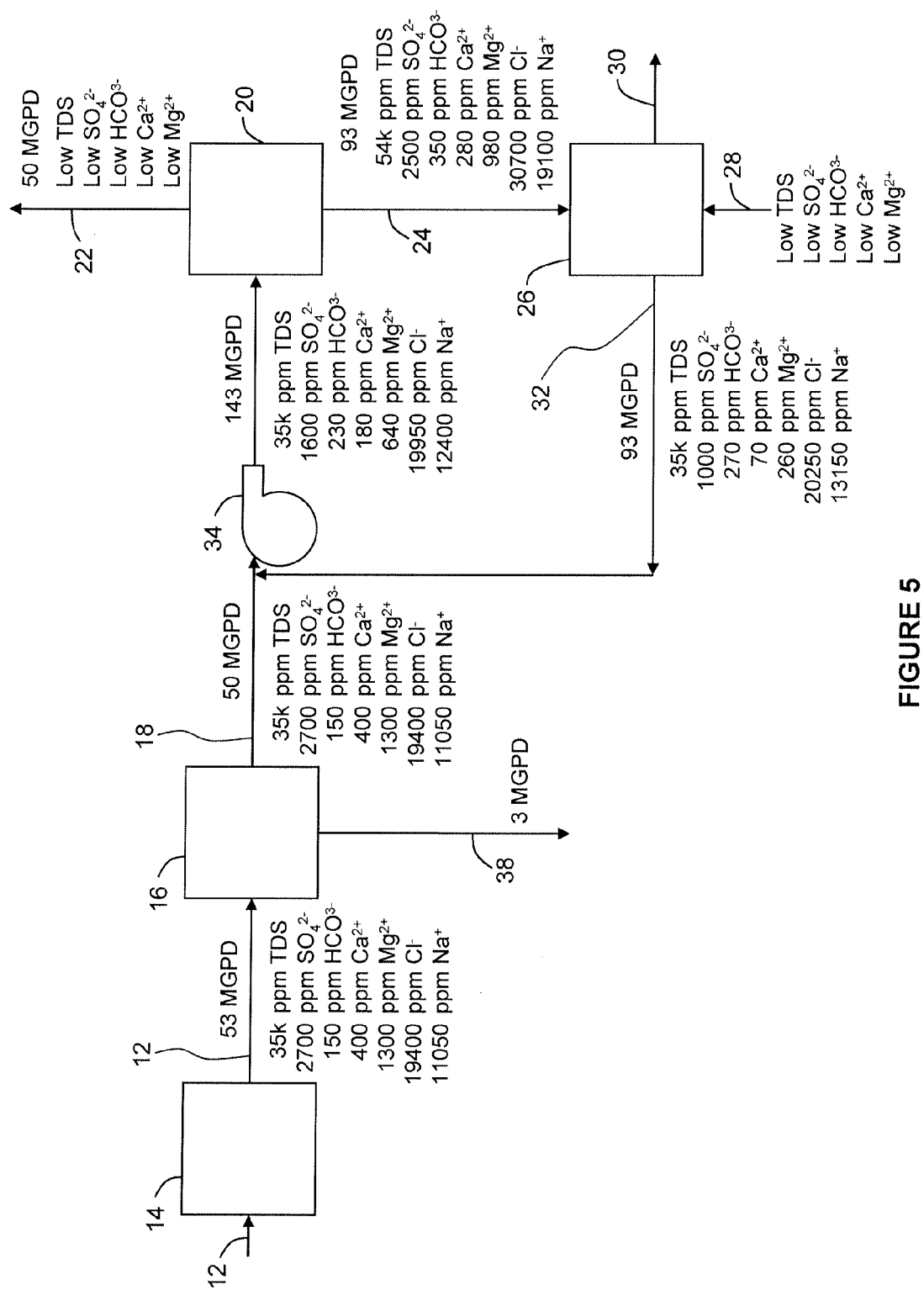
FIG. 5 is a schematic process flow diagram of the water treatment system of FIG. 1 operating at 35% recovery in a desalination step for use in a comparative example with FIG. 4.

FIGS. 2 to 5 describe the results of modeling experiments. FIGS. 2 and 4 represent a typical desalination system operating at 50% and 35% recovery, respectively. FIGS. 3 and 5 represent a water treatment system 10 as in FIG. 1 operating at desalination step recoveries of 50% and 35% recovery, respectively, but with near 100% system level recovery. A comparison between FIGS. 2 and 3, or between FIGS. 4 and 5, demonstrates a substantial reduction in flow through the intake and pre-treatment steps.

A comparison between FIGS. 2 and 3, or between FIGS. 4 and 5, also demonstrates a substantial reduction in the concentration of various ions in water fed to the desalination process. In the model, the ED unit was assumed to have ion exchange membrane selectivities equivalent to those of an electrodialysis reversal unit from GE Water and Process Technologies. These units use multi-valent ion selective membranes. For example, calcium and sulfate ions are removed to a greater extent than sodium and chloride ions. The salt reduced reject water 32, when mixed with pretreated seawater 18, produces a combined feed with a reduced concentration of divalent ions. Since divalent ions are often responsible for forming scale in desalination processes, the potential for these types of scaling are reduced. In particular, with thermal desalination processes using evaporators, calcium sulfate becomes less soluble as the temperature increases. Reducing the concentration of calcium and sulfate ions allows a thermal desalination process to operate at one or more of a higher temperature, a higher recovery, or with more effects in a multiple-stage flash evaporator. Any of these changes improves the operation of the desalination process either in terms of recovery, throughput per device, or energy efficiency.

Figure 6:
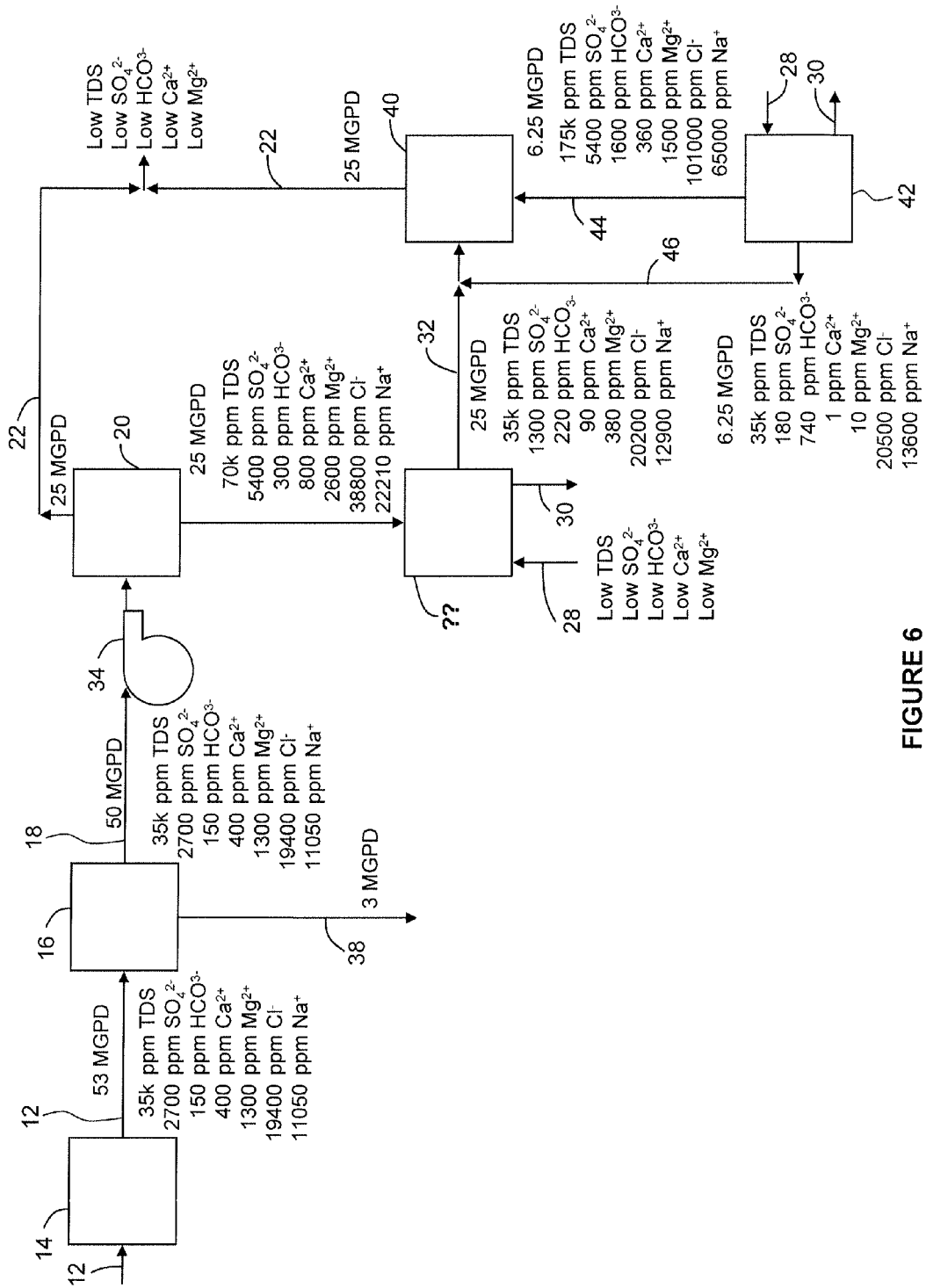
FIG. 6 is a schematic process flow diagram of a water treatment system having a combination of thermal desalination, reverse osmosis and electrodialysis.

Optionally, salt reduced reject water can be treated by a thermal desalination unit to produce product water without recycling the salt reduced reject water, or brine from the thermal desalination unit, to a desalination unit (which may be a reverse osmosis unit) treating the pre-treated seawater. In this case, the thermal desalination unit may be operated at a recovery rate of 60% or more. The system as a whole may still recovery 80% or more of the raw seawater or the pre-treated seawater as product water. FIG. 6 illustrates a modeling experiment based on a further modified system in which rejected brine 44 from a thermal desalination unit 40, such as an evaporator or distillation unit, is treated in a second ED device 42. The second ED device 42 also receives low salinity water 28 and discharges salty discharge water 30. Salt reduced rejected brine 46 from this second ED device 42 is recycled to the thermal desalination unit 40. The concentrations of calcium and sulfate ions reaching the thermal desalination unit 40 are greatly reduced relative to the raw seawater 12. This allows the thermal desalination unit 40 to operate at a very high recovery rate, for example 70% or more. The recovery rate for the system as a whole may be 90% or more.

This written description uses examples to disclose one or more embodiments of the invention, and also to enable a skilled person in the art to practice the invention. The scope of the invention is defined by the claims and may include other apparatus or processes.

The invention claimed is:

1. A process for producing desalinated water comprising the steps of:
    a) desalinating feed water to create product water and concentrate;
    b) transferring salt from the concentrate to a low salinity water stream to convert the concentrate to salt reduced reject water and convert the low salinity stream to a wastewater stream containing the transferred salt, and extracting at least some of a salinity gradient power available from a difference in salinity between the concentrate and the low salinity water stream; and,
    c) desalinating the salt reduced reject water to produce additional product water.

2. The process of claim 1 wherein the wastewater stream containing the salt is made to have a salinity that is within 10% of the salinity of the feed water.

3. The process of claim 1 wherein salt from the concentrate is transferred through a divalent ion selective membrane.

4. The process of claim 3 wherein at least some of the salt reduced reject water is co-treated with the feed water and step (a) comprises a thermal desalination process.

5. The process of claim 1 wherein step (b) comprises electrodialysis.

6. The process of claim 5 wherein the electrodialysis step comprises reverse electrodialysis.

7. The process of claim 6 wherein step (c) comprises reverse osmosis.

8. The process of claim 6 wherein step (c) comprises thermal desalination.

9. The process of claim 8 further comprising a step of treating rejected brine from the thermal desalination unit by electrodialysis and step (c) further comprises treating at least some of the treated rejected brine by the thermal desalination.

10. The process of claim 1 wherein the step (a) comprises reverse osmosis.

11. The process of claim 1 wherein at least some of the salt reduced reject water is co-treated with the feed water.

12. The process of claim 11 wherein some of the concentrate, or some of the salt reduced reject water, is discharged from the process.

13. The process of claim 1 further comprising pre-treating the feed water to remove suspended solids and to kill, or prevent the growth of, microorganisms.

14. The process of claim 1 wherein 80% or more of the feed water is converted into product water.

15. The process of claim 1 wherein the low salinity water comprises effluent from a municipal wastewater treatment plant.

16. An apparatus for producing desalinated water comprising,
    a) a desalination unit having an inlet connected to a source of feed water and having a product water outlet and a concentrate outlet; and,
    b) an ion exchange membrane device comprising a reverse electrodialysis device having an inlet connected to the concentrate outlet, and a salt reduced reject water outlet, wherein the salt reduced reject water outlet is connected to the inlet of the desalination unit.

17. The apparatus of claim 16 wherein the ion exchange membrane device has a cell carrying a flow of wastewater on the opposite side of an ion exchange membrane from a cell in communication between the inlet of the ion exchange membrane device and the salt reduced reject water outlet.

18. The apparatus of claim 17 wherein the ion exchange membranes are divalent ion selective.

19. The apparatus of claim 16 further comprises a bleed line connected to the reject water outlet or the salt reduced reject water outlet.

20. The apparatus of claim 16 wherein the desalination unit comprises a reverse osmosis unit.

* * * * *